UNITED STATES PATENT OFFICE.

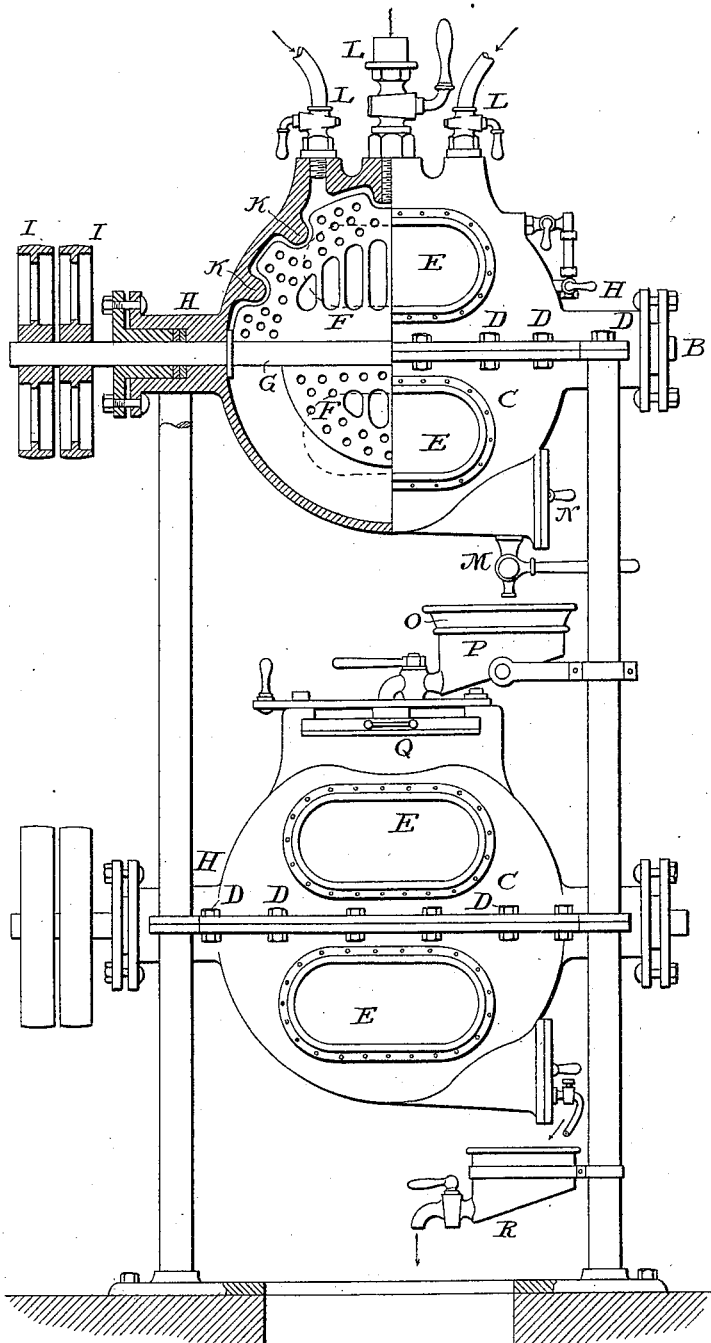

MICHEL GLAESENER AND GEORGES GLAESENER, OF CHATILLON, AND EMILE D'HUART, OF LUXEMBURG, BELGIUM.

PROCESS OF AND APPARATUS FOR PURIFYING WATER.

SPECIFICATION forming part of Letters Patent No. 607,361, dated July 12, 1898.

Application filed August 21, 1896. Serial No. 603,551. (No model.) Patented in Belgium February 27, 1895, No. 120,249.

*To all whom it may concern:*

Be it known that we, MICHEL GLAESENER and GEORGES GLAESENER, citizens of Belgium, residing at Chatillon, county of Belgian Luxemburg, and EMILE D'HUART, a citizen of Luxemburg, residing at Luxemburg, in the Province of Luxemburg, Belgium, have invented a new or Improved Method of and Apparatus for Softening Water for Industrial and other Purposes, (patented in Belgium February 27, 1895, No. 120,249,) of which the following is a specification.

The present method has for its object the softening of underground and spring water for industrial purposes, either for the feed-water of steam-boilers or for the washing of textile fiber and the like, or for any other purpose where the presence of calcium, magnesium, or other hardening matters in the water may be detrimental.

Our invention, in so far as the method is concerned, is based upon the following chemical reactions: First, oleic acid, as a by-product in the manufacture of stearin, forms with the caustic alkalies and also with the alkaline carbonates (in the latter case with separation of carbonic acid) soluble oleates either direct or with the application of a little heat; second, these alkaline oleates form, with soluble calcium magnesium and other salts found in the water, light compounds, which, being insoluble in water and having a less specific gravity, rise to the surface of the same as a doughy material and are easily separated therefrom; third, the alkaline-oleate compounds also form with aluminium sulfate, ferric sulfate, alum, ferric alum, and similar compounds insoluble oleates of light specific gravity, which are readily separated from the water, thus clarifying the water which has already been freed from the lime, magnesium, or other hardening substances. The application of these reactions to the softening of the water may be effectuated in the following manner. It is before all necessary to take into consideration the formation of the soluble alkaline oleates:

First. This is effected by the combined action of oleic acid and alkaline hydrates. Then we proceed as follows: In a suitable water-receptacle provided with a stirrer we introduce into the water to be purified the necessary quantity of oleic acid and cause the same by rapid stirring to be held in suspension, a suitable quantity of the solution of alkaline hydrate being introduced during the movement. In a short time all the oleates of the hardening elements become separated as insoluble doughy material, which quickly collects at the surface of the water. The rapidity of separation of these materials may be increased by adding oleic acid. A small excess of alkalies enables the calcium, magnesium, and other hardening salts to be perfectly separated. If the proper quantity of the alkaline hydrates has been added to the water containing lime, magnesia, or other hardening matter, the water may be used in this state for industrial purposes if the opalescence of the same has no deleterious effect. It may, however, be completely clarified by salts having an acid reaction—such as aluminium, iron, or similar acid salts. The alkalinity of the water thus treated may be easily determined and a solution of the said salts must be added until it gives a neutral reaction. The reaction is accelerated by rapid rotary movement. This operation may be effected in the same receptacle as the first; but it may also take place according to exigencies in a separation-receptacle, into which the water passes from the first receptacle through a metallic sieve in order that the coarser impurities may be separated out. It may also appropriately take place in the presence of frictional agents, such as sawdust and paper material. Treated in this manner the water passes into a sand filter, which it leaves in a pure state. After its clarification the water must not contain a trace of the clarifying-salts employed. These may be used in a solid form.

A more troublesome method of clarifying the water from which the hardening matters have been removed consists in treating this water with small equivalent quantities of hydrochloric or sulfuric acid. Here, too, there must be rapid rotary movement in which the friction may appropriately be increased by clean sawdust or paper material which is free from lime for the purpose of accelerating the reaction. In this instance the water-purifying receptacle would require to have a leaden lining. The filtering material would have to consist of as pure silicious matter as possible and the water would have to be finally freed again from the excesses of acid by sodium carbonate or other neutralizing agents.

Second. If alkaline carbonates are employed for the formation of the alkaline oleates, this must be effected with the use of a little heat—say by a current of steam. The reaction may be effected in the small space which is contained in the water-admission pipe and into which the appropriate quantities of reagents are brought together and are intimately mixed—say by a current of steam. After the reaction, which scarcely takes a few seconds, the material is conveyed by the water admitted into the first rotary receptacle in order to be then further treated, as above stated. The alkaline oleate may also suitably be prepared outside the apparatus, and being contained in a suitable vessel introduced into the water-admission pipe.

For the proper progress of the process the proportions of quantities of reagents have before all to be considered. No considerable excess of alkaline hydrate or alkaline carbonate must be employed. The quantity to be used of these bodies must exactly correspond to the equivalent for the quantity of lime, magnesia, or other hardening matter contained in the water. For determining this equivalent it might be expedient to ascertain the hardness; but this may suitably be replaced by a new method which serves as a basis for that of the purification of water. As an example of the new method forty cubic centimeters of water are mixed with a few drops of oleic acid in a suitable bottle thoroughly shaken, and tenths of normal alkaline liquor are added until a rapidly-vanishing foam is formed. The number of cubic centimeters of tenths of normal liquor as read off corresponds to the equivalent of the calcium and magnesium salts. From this the quantities of alkaline hydrates or carbonates to be used can be calculated for any desired quantity of water. This method permits of an accurate determination of the hardness of the water. Even percentages of lime, magnesia, and other bodies may be most accurately determined by the same. This may further be advantageously applied to iron, copper, and the like, and any analytical determination may be used in which the substance, can be separated as neutral salts and in which the metals contained in the latter will combine with the oleic acid to form insoluble compounds.

The oleic acid used in the method hereinbefore set forth may easily be recovered by treatment of the calcium, magnesium, and other oleates with hydrochloric or sulfuric acid. The water itself, whatever may have been its original composition, is brought by the usual reagents to the purity of rain-water.

Having thus described that part of our invention which consists of the method, we shall now proceed to describe that part of our invention which consists of the apparatus.

In our various experiments we have found that the apparatus hereinafter described gives the best results. This apparatus is composed of the following parts:

(a.) A spherical receptacle comprising two semispherical caps C C, connected along a diameter A B by means of bolts D, with interposition of a packing of india-rubber, asbestos, felt, or any other material insuring a perfectly tight joint. In the sides of the spherical caps openings are provided, closed by plates E of glass or any other transparent material adapted to withstand the action of the water and reagents, in order to enable the operator to see the liquid contained in the receptacle and easily follow the operations.

(b.) Beaters F, formed of two semicircular segments of different diameters, keyed upon the axis G, passing by two stuffing-boxes H through the semispherical caps of the receptacle. These beaters are set in more or less rapid rotation, according as the operation has to be continued with more or less rapidity, by means of a pulley I and through the intervention of a belt receiving its movement from any transmitting-gear or directly from the fly-wheel of the steam-engine or the motor in the establishment. Of course the beaters may also be operated by any other suitable means. The rotation of the beaters has the effect of energetically whipping the water contained in the receptacle, and thus bringing all the molecules of the water and reagents more rapidly in contact. With the object of insuring the maximum effect we also arrange upon the interior periphery of the receptacle small projections K of flat, cylindrical, or any other form, and in order not to stop the movement of the beater, which would otherwise strike against these projections, we provide in the semicircular segments F the notches e, affording passage with a minimum amount of play for the projections hereinbefore referred to.

(c.) At the upper part of the receptacle are placed the cocks for introducing the water to be purified and the reagents. At the lower part is placed the discharge-cock M and the door N for removing the cake formed by the combination of the calcium and magnesium salts and reagents.

(d.) Immediately below the discharge-cock M we place a filter O, composed of a receptacle of cylindrical or other form in which the filtering material (coke, sand, felt, cellulose, or the like) is put. Upon the filtering material is placed a metallic sieve designed to retain the calcareous cake. This filter may be arranged in such a manner as to cause it to turn about a horizontal axis P, facilitating the removal of the said calcareous cake retained upon the metallic sieve, this cake being caused to drop into a tub or other receptacle designed to receive it and placed in proximity to the apparatus.

The apparatus thus described may be used for a number of cases when perfect clearness of the water is not required. When it is desired to completely clarify the water treated in this apparatus, we place immediately below the filter O or by the side of the first apparatus a second spherical receptacle C' similar to the first, except that the cocks placed at the upper part are replaced by a door Q, adapted to be withdrawn like a slide or to be opened upon hinges or in any other manner. This door tightly closes an opening designed for introducing into the spherical receptacle a certain quantity of sawdust or paper-pulp. Through this opening we also admit the purified water coming directly from the filter hereinbefore described when the receptacle is placed immediately below or through the intervention of a pump when the room at disposal does not permit of such an arrangement. Similar beaters to those used in the first receptacle and operated like them whip again the water brought in contact with the reagents designed to render the water limpid, which leaves the upper receptacle in a more or less opalescent state. When this clarification takes place by means of sulfuric or hydrochloric acid, the interior of this receptacle is covered, as are also the beaters, dischargecocks, and the receptacle of the filter hereinbefore mentioned, with a thin layer of lead in order to protect the metal from corrosion. Immediately below this second receptacle is a filter R, similar to the first, and the water on leaving this filter is conveyed directly, either by pipes or in any other manner, into a cistern, basin, or any other receptacle which may be deemed suitable, provided that it is not composed of materials containing calcium or magnesium salts.

Now the mode of operating is as follows: The first receptacle is connected either to the water-supply or the feed-well through the medium of a pump or a pipe. The water to be purified is introduced into the receptacle by opening the cock at will, and quantity (say, in liters) is indicated by a water-level arranged on the outside of the apparatus and in sight of the operator. This quantity having entered the apparatus the admission-cock is closed and the one is opened which admits alkaline hydrate, the quantity of which is determined beforehand by the degree of hardness of the water to be treated, as described in the chemical description of the process. We close the cock and set the beaters in motion for some minutes. Then we stop the motion and introduce the desired quantity of fatty acid, whereupon the beaters are again set in motion. We allow them to rotate for some minutes and then stop them again, and we see the calcareous cake completely formed and floating on the surface of the water. We may also proceed inversely, first, by introducing the fatty body and then the alkaline hydrate. After a minute's rest we cause the water thus purified to flow out into the filter, which flow lasts for some minutes. We open the door for removing the cake, which falls upon the metallic sieve. We close it again and also the cock and we introduce a fresh charge of water, recommencing the operation in the same manner. The water leaving the filter, if it is to be rendered absolutely limpid, is conveyed into a second receptacle, after we have introduced into the latter a suitable quantity of sawdust and sand, unless we cause it to flow out directly into the cistern or into the basins designed for its reception after the purification. When the water has entered the second spherical receptacle, we introduce into the same the desired quantity of the clarifying agent, we close the door, set the beaters in motion, and stop them after they have rotated for some minutes. Then we open the cock, which allows it to flow upon the filter, whence it leaves in a perfectly limpid state in order to be conveyed into the storing-basins. All these operations take only about ten minutes and the quantity purified in each operation depends simply on the capacity of the receptacles. For example, an establishment which requires thirty cubic meters of purified water per day of twelve working hours may use receptacles having a useful capacity of three hundred liters, which enables three thousand liters to be completely purified per hour or thirty cubic meters in ten hours.

What we claim as new, and desire to secure by Letters Patent, is—

1. The method of softening water containing ingredients of a hardening nature, consisting in introducing into such water separately a fatty acid and an alkaline salt, agitating the water and first ingredient before the second ingredient is added, whereby insoluble earthy oleates are formed, and then mechanically separating said oleates from the water.

2. The method of softening water containing ingredients of a hardening nature consisting in introducing into such water oleic acid, agitating the water and oleic acid therein, introducing an alkaline salt into such water and acid, whereby insoluble oleates are formed of less specific gravity than the water, and then filtering the water to separate therefrom said oleates.

3. The method of softening and clarifying water containing ingredients of a hardening nature consisting in first treating the same with a fatty acid and an alkaline salt to form insoluble oleates, then adding salts having an acid reaction, such as iron acid salts, and then filtering the water.

4. The method of softening and clarifying water containing ingredients having a hardening nature, consisting of adding to such water oleic acid and an alkaline salt, then agitating the solution, then filtering the solution, then adding to such filtered solution salts having an acid reaction such as aluminium, acid salts, then agitating the solution so treated and finally filtering the solution.

5. In an apparatus for the purpose described, a support, a receptacle provided at or near its top with a plurality of valved inlet-ports, at its bottom with a valved discharge-port, and at its side near the bottom with a door, a filter below said discharge-port, a second receptacle having at or near its top a door through which said filter is adapted to discharge into said second receptacle, said second receptacle having a door at its side near the bottom, and stirrers in said receptacles, substantially as described.

6. In an apparatus for the purpose set forth, a substantially spherical receptacle composed of two substantially semispherical sections, secured together, the upper section having an inlet-port, and the lower section having a discharge-port at the bottom and a door at its side near the bottom, and a rotary stirrer in said receptacle, substantially as described.

In testimony whereof we affix our signatures in presence of two witnesses.

MICHEL GLAESENER.
GEORGES GLAESENER.
EMILE D'HUART.

Witnesses:
P. MAJERUS,
T. DERNEDEN.